Patented Feb. 19, 1952

2,586,680

UNITED STATES PATENT OFFICE 2,586,680

POLYVALENT METAL TETRA-ISOBUTYL PHENOL SULFONIC ACID SALT PARASITICIDES

George L. Matheson, Union, and Louis A. Mikeska, Westfield, N. J., assignors to Standard Oil Development Company, a corporation of Delaware No Drawing. Application December 28, 1946, Serial No. 719,118

4 Claims. (Cl. 260—429)

This invention relates to a new insecticidal composition and particularly to improvements in the toxicity of insecticides.

Nicotine sulfate, derris, rotenone, deguelin, toxicarol, tephrosin, lead arsenate, dichloro-diphenyl-trichloroethane, and other well-known insecticides have, at various times, been used to control the Japanese beetle. These various insecticides have been used as dusting powders and also as liquid sprays, but the effectiveness, when used as a dust or spray, at no time was found to be very high. The effectiveness varied according to the weather and other factors which determined the time of contact of the Japanese beetle and the insecticide. The contact of the insecticide and Japanese beetle was at all times, especially difficult to obtain.

It has now been found that the tetraisobutenyl sulfonates and tetraisobutylphenol sulfonates of certain polyvalent metals have insecticidal and fungicidal properties. The following data demonstrates the insecticidal and fungicidal activities of polyvalent metal derivatives of tetraisobutylphenol sulfonic acid.

Oftentimes, however, the various metal derivatives may be prepared just prior to spraying by mixing the sodium compound with a suitable reactive compound of the desired metal.

The polyvalent metal derivatives of the sulfonic acids prepared according to United States Patents 2,162,269 and 2,192,189 may be utilized as constituents of oil or aqueous solutions or dispersions or when suitable solids as dusting compounds or constituents of dusting compositions. These reaction products may be sulfonate compounds containing $C_{16}$ alkyl groups or mixtures of compounds containing shorter alkyl groups with or without the $C_{16}$ alkylated sulfonate compounds.

What is claimed is:

1. As a new composition of matter, a polyvalent metal salt of tetra-isobutyl phenol sulfonic acid, the metal constituent of said salt being selected from the group consisting of zinc, copper and iron.

2. A new composition of matter as in claim 1 in which the salt is the zinc salt.

3. A new composition of matter as in claim 1

|  | Insecticidal—Contact Immersion | | American Roach—Bloodstream Injection | | Fungicidal | |
|---|---|---|---|---|---|---|
|  | German Roach | Milkweed Bug | Female | Male | Alternaria solani | Sclerotinia Fructicola |
| Zinc tetraisobutyl phenol sulfonate | 100 | 75 | 80 | 100 | <0.001 | <0.001 |
| Ferric salt | 95 | 90 | 80 | 100 | 0.01–0.001 | 0.01–0.001 |
| Copper salt | 95 | 100 | 80 | 80 | 0.01–0.001 | <0.001 |

The various metal tetraisobutylphenol sulfonates are usually prepared from the corresponding sodium salt as exemplified by the following description of the preparation of zinc tetraisobutyl phenol sulfonate.

6.8 g. of ZnCl dissolved in 75 cc. of absolute ethyl alcohol was added to a solution of 42 g. of sodium tetraisobutyl phenol sulfonate dissolved in 150 cc. of ethyl alcohol. The resulting mixture was heated to refluxing temperature for 2 hours after which it was cooled to room temperature and the precipitated sodium chloride filtered off. The filtrate was placed in a distilling flask and the solvent distilled off. The last traces of solvent was removed at 120° C. under reduced pressure. Recovered 40 g. of a light colored pulverizable solid soluble in alcohol and acetone.

The iron and copper tetraisobutyl phenol sulfonates were prepared in a manner similar to that described above by substituting the appropriate metal halide for the zinc chloride.

in which the salt is the copper salt.

4. A new composition of matter as in claim 1 in which the salt is the iron salt.

GEORGE L. MATHESON.
LOUIS A. MIKESKA.

REFERENCES CITED

The following references are of record in the file of this patent:

UNITED STATES PATENTS

| Number | Name | Date |
|---|---|---|
| 1,853,397 | Banks | Apr. 12, 1932 |
| 2,058,504 | Rauschert | Oct. 27, 1936 |
| 2,192,689 | Mikeska | Mar. 5, 1940 |
| 2,196,985 | Flett | Apr. 16, 1940 |
| 2,209,169 | Mikeska et al. | July 23, 1940 |

FOREIGN PATENTS

| Number | Country | Date |
|---|---|---|
| 453,923 | France | Apr. 17, 1913 |